(12) United States Patent
Nathan et al.

(10) Patent No.: US 6,757,647 B1
(45) Date of Patent: Jun. 29, 2004

(54) METHOD FOR ENCODING REGULAR EXPRESSIONS IN A LEXIGON

(75) Inventors: Krishna S. Nathan, New York, NY (US); Eugene H. Ratzlaff, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/126,269

(22) Filed: Jul. 30, 1998

(51) Int. Cl.[7] .................. G06F 17/21; G06F 17/22; G10L 9/00
(52) U.S. Cl. .................. 704/10; 704/254; 715/532
(58) Field of Search .................. 704/1, 9, 10, 254, 704/255, 260, 258; 707/530, 532, 533; 341/51

(56) References Cited

U.S. PATENT DOCUMENTS

| | | | | |
|---|---|---|---|---|
| 4,747,053 A | * | 5/1988 | Yoshimura et al. | 704/10 |
| 5,333,313 A | * | 7/1994 | Heising | 704/1 |
| 5,530,645 A | * | 6/1996 | Chu | 707/532 |
| 5,548,507 A | * | 8/1996 | Martino et al. | 704/9 |
| 5,561,421 A | * | 10/1996 | Smith et al. | 341/51 |
| 5,663,721 A | * | 9/1997 | Rossi | 341/51 |
| 5,758,024 A | * | 5/1998 | Alleva | 704/255 |
| 5,861,827 A | * | 1/1999 | Welch | 341/51 |
| 5,889,481 A | * | 3/1999 | Okada | 341/51 |
| 5,913,185 A | * | 6/1999 | Martino et al. | 704/9 |
| 5,999,949 A | * | 12/1999 | Crandall | 707/532 |
| 6,002,998 A | * | 12/1999 | Martino et al. | 704/9 |
| 6,085,160 A | * | 7/2000 | D'Hoore et al. | 704/256 |
| 6,092,070 A | * | 7/2000 | Belcea | 707/101 |
| 6,178,397 B1 | * | 1/2001 | Fredenburg | 704/1 |

* cited by examiner

Primary Examiner—Patrick N. Edouard
(74) Attorney, Agent, or Firm—F. Chau & Associates, LLC

(57) ABSTRACT

Systems and methods are described for concisely encoding into a lexicon (or dictionary) and decoding from the lexicon regular expressions that can represent certain huge word lists that might otherwise be considered unmanageably large. Sets of words (character sequences or 'strings') that share certain commonalities such as a set of numbers, which share common digits, may be condensed into digital lexicons by representing the set with a regular expression. The regular expression is a string that includes meta-character, where each meta-character is a place-marker that represents a set of at least two normal characters. When accessing or searching the lexicon, the regular expressions are dynamically expanded, as needed, to the underlying, original word list. The methods disclosed are applicable to many lexicon driven language based systems such as spelling verification systems, handwriting recognition systems, speech recognition systems and the like.

24 Claims, 4 Drawing Sheets

METHOD FOR ENCODING REGULAR EXPRESSIONS IN A LEXIGON

BACKGROUND OF THE INVENTION

1. Field of the Invention

The present invention relates generally to language recognition and more particularly relates to a system and method for creating and using electronically encoded lexicons that include regular expressions for augmenting the lexicon to cover large sets of entries such as fractions, dates, and real numbers.

2. Background of the Invention

Many software applications, such as spelling verifiers or handwriting recognizers, employ lexicons (or dictionaries) in order to quickly and efficiently derive valid words or qualifying character sequences for comparative or generative purposes. In spelling verifiers and some recognizers, input data (unqualified character sequences) are compared with accepted lexicon entries and are thereby verified or invalidated. In some recognizers, a handwritten word is transcribed through a process that aligns the features of the handwritten word to the best-fitting lexicon entry. In both cases, no valid result is produced unless it is represented in the lexicon. Spelling verification software invalidates misspellings and the lexicon-restricted handwriting recognizer cannot correctly transcribe (unusual) words not found in the lexicon. For example, since the word 'clads' is not typically found in most lexicons, it would likely be invalidated by spelling verifiers and incorrectly transcribed (perhaps as 'dads') if written and machine-recognized.

Large lexicons are desired to provide complete coverage over the legitimate range of items (words, numbers, abbreviations, codes, mnemonics, etc.) that may be entered. Unfortunately, no general-purpose lexicon can even approach completeness since the inclusion of even a reasonable subset of common fractions, dates, and real numbers, for example, would increase the lexicon size by many orders of magnitude. As a result, the word coverage of the recognizer or spelling verifier suffers from either incompleteness or it must be augmented by additional, external logic that must be integrated with the lexicon. Methods that depend on external logic are generally awkward and incomplete. Rule-based methods can be used for generating or evaluating character sequences, but such methods generally require that software be prepared by or with an expert before the lexicon and/or system is released for common use.

Such expert or rule-based systems are generally non-extensible, or are only extensible by highly qualified experts. Consequently, a general method for encoding the vast number of more common numbers, fractions, and dates within a lexicon is highly desirable.

SUMMARY OF THE INVENTION

A method for using regular expressions to represent (typically large) subsets of entries in a lexicon is described. Meta-characters are used to represent a class of characters. One or more meta-characters and (optionally) standard characters are used to create a regular expression string. Each such string represents or encodes a class or set of one or more words or lexicon entries. Regular expression strings are entered into the lexicon with all other lexicon word entries.

In accordance with a method for creating an encoded lexicon, a meta-character is defined as representing a set of at least two symbols. An unencoded lexicon is then read and a substitution process is performed where the meta-character is substituted into entries in the lexicon which comply with the meta-character definition. Preferably, the meta-character is a user defined entry in a meta-character definition table having a plurality of meta-characters.

A method of searching an encoded lexicon encoded with a meta-character representing at least two symbols includes the steps of submitting a search string having a plurality of symbols; substituting the symbols represented by said meta-character to generate a meta-string; and comparing the entries of the encoded lexicon for at least partial matches to the meta-string. The at least partial matches are then expandable by substituting the meta-characters in the partial matches for the symbols represented by the meta-character.

In accordance with the present invention, a method for generating unencoded word hypotheses to test against submitted data uses an encoded lexicon having a tree based structure. The tree based encoded lexicon includes a plurality of entries which have a plurality of linked character nodes, including a first node and a terminal node. At least one of the nodes is a meta-character representing at least two other characters. The generative method includes the steps of generating first hypotheses including first node characters of all entries of the encoded lexicon. The first current hypotheses are tested against the submitted data to determine whether the hypotheses are probable partial matches. For each probable branch identified, those hypotheses are refined by adding characters from subsequent linked character nodes. The refined hypotheses are then tested against the submitted data to determine whether the refined hypotheses are probable partial matches. For each further probable branch which is identified where the current node is not a terminal node, the steps of refining and testing the hypotheses are repeated. For each further probable branch reaching a terminal node where the current refined hypothesis is a probable match to the submitted data, the refined hypothesis is provided as an output indicative of a probable match.

In accordance with one form of the present invention, a computer-based language verification system using a lexicon is formed with a first data file having an unencoded lexicon and a second data file having a meta-character definition table. The meta-character definition table is a many to one mapping between a meta-character and a plurality of language characters. The system includes a computer processor which is coupled to the first and second data files and generates a third data file therefrom, which is an encoded lexicon. The processor generates the encoded lexicon by reading entries from the unencoded lexicon data file and substituting meta-characters from the second data file into the lexicon entries in accordance with the meta-character definition table.

Preferably, the computer-based language verification system includes an input device coupled to the processor for submitting a language string for verification. The processor receives the language string, performs meta-character substitution on the string in accordance with the meta-character definition table to generate a meta-string, searches the third data file for entries which at least partially match the meta-string, and expands the at least partially matching entries in accordance with the meta-character definition table.

In a further embodiment of the computer-based language verification system, the input device includes a pen-based interface for receiving handwriting input strings. Alternatively, the input device includes a spelling verification program operating on a text document. In yet another alternate embodiment, the input device includes a speech recognition system having an audio input system and a speech processor to form the language string from spoken utterances.

Preferably, the second data file is a user extensible data structure which has a user friendly syntax. Meta-characters can be defined to represent a class of multi-character words or strings. In addition, meta-characters can be nested, i.e. one meta-character definition can include a previously defined meta-character.

These and other features, objects and advantages of the present invention will become apparent from the following detailed description of illustrative embodiments thereof, which is to be read in connection with the accompanying drawings.

BRIEF DESCRIPTION OF THE DRAWINGS

The invention will be described in detail in connection with the following figures, wherein.

DETAILED DESCRIPTION OF PREFERRED EMBODIMENTS

The present invention uses symbols, referred to as meta-characters, to create representations of large sets of entries in a lexicon. The meta-characters are used in conjunction with a conventional unencoded lexicon to generate an encoded lexicon, in which single lexicon entries symbolically represent multiple entries. The encoded lexicon is later decoded, again by use of the set of meta-characters and a recursive algorithm, to create an expanded lexicon in which all entries are available. When a string is submitted for recognition or verification, the submitted string is subjected to the set of meta-characters in a meta-character table to perform meta-character substitution upon the submitted string. This new string is then used to search the encoded lexicon for possible matches. Preferably, the meta-character table is readily extensible by an end user, thereby making the encoded lexicon extensible.

Figure 1:
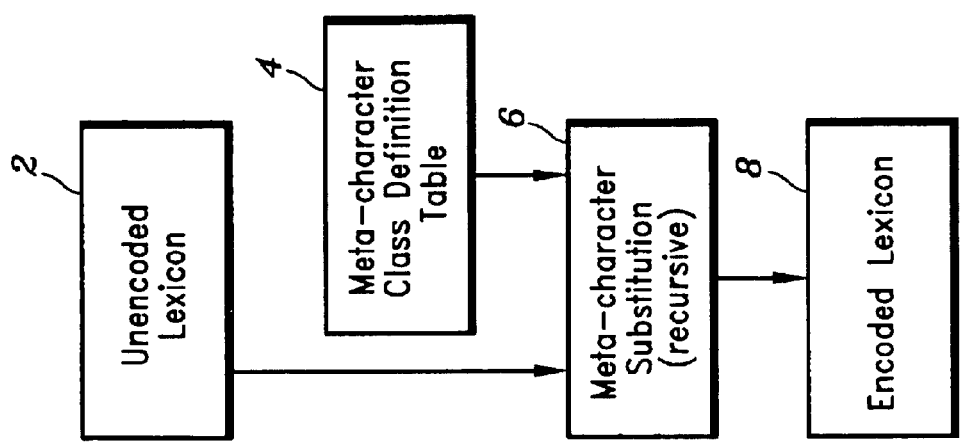
FIG. 1 is a flow diagram which illustrates a method for creating an encoded lexicon using meta-characters.

FIG. 1 is a flow diagram which illustrates a method for creating an encoded lexicon in accordance with the present invention. The method uses a conventional unencoded lexicon 2 and a meta-character class definition table 4 to generate an encoded lexicon 8. The method uses recursive substitution 6 to insert meta-characters defined in the meta-character class definition table 4 into matching characters in the unencoded lexicon 2.

For example, assume that the unencoded lexicon 2 includes the set of terms {hid, had, sit, sat, hit, hat} and the meta-character class definition table 4 includes the following definitions:

@={a,i} where the comma represents a logical OR function; and

λ={@+t} where the plus sign represents a logical AND function.

As the terms of the unencoded lexicon 2 are subjected to meta-character substitution 6, the following encoded lexicon 8 results: {hλ, sλ, h@d}. Note that the meta-character λ is a nested meta-character which uses the previously defined meta-character @ as part of its own definition.

Meta-characters may also be used to represent a class of multi-character words or strings. For example, dates can be represented in the following way:

| Meta-character | Class represented |
| --- | --- |
| # | {0, 1, 2, 3, 4, 5, 6 7, 8, 9} |
| & | (Jan., Feb., Mar., Apr., May, Jun., Jul., Aug., Sep., Oct., Nov., Dec. } |

Using these meta-character definitions, a lexicon comprising the encoded expressions (& #, 19## and & ##, 19#, ##/##/##) could represent all dates in the 20th century of the form given in the following examples:

Jan. 4, 1951

Oct. 15, 1999

Apr. 24, 1965

While not all combinations in this example are legal, e.g. Feb. 67, 1900, further refinements can ameliorate or eliminate such problems.

Using the "#" meta-character defined above, all two-digit numbers in the set {00–99} could be represented as ##. Similarly, fractions may be represented in various forms such as (#/#, #/##,##/##,##/###, etc.). Other common numeric forms may also be represented in a like manner.

The above listed meta-character definitions are merely exemplary. Preferably, the meta-character class definition table 4 is fully extensible by an end user using the syntax illustrated as well as other similar, simple syntax formats.

Figure 2:
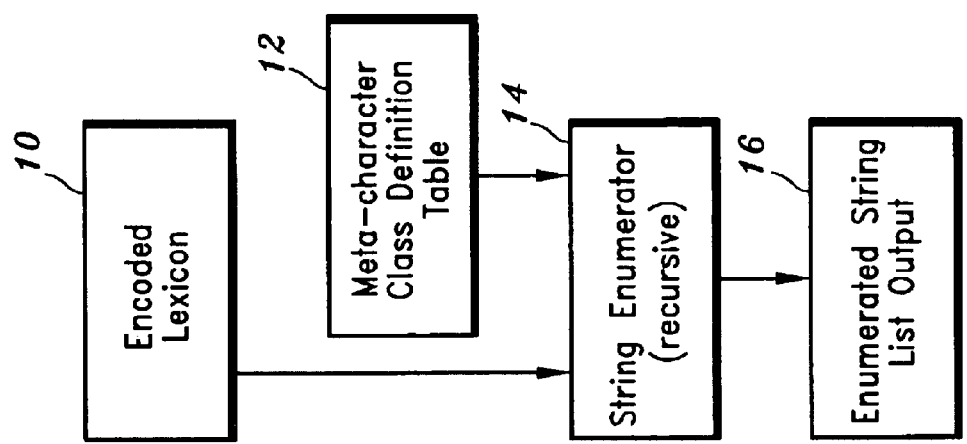
FIG. 2 is a flow diagram which illustrates a method for decoding an encoded lexicon containing meta-characters.

Referring now to FIG. 2, a method and example for decoding an encoded lexicon 10 with a meta-character class definition table 12 is shown. The method depicted in FIG. 2 starts with an encoded lexicon 10, as described in connection with FIG. 1. A meta-character class definition table 12 is then used with a recursive substitution algorithm, referred to as a string enumerator 14, to replace each entry encoded with a meta-character back into a full, unencoded list of entries. The output from the string enumerator 14 is an unencoded, enumerated string list output 16.

As an example of the decoding operation of FIG. 2, assume that the encoded lexicon 10 includes the entries (hλ, sλ, h@d) and that the meta-character class definition table 12 includes (@={a,i}, λ={@+t}), where a comma represents a logical OR function and the plus sign represents a logical AND function. Upon operation of the string enumerator algorithm 14, an enumerated string output list 16 is generated which includes the following: (hid, had, sit, sat, hit, hat).

Figure 3:
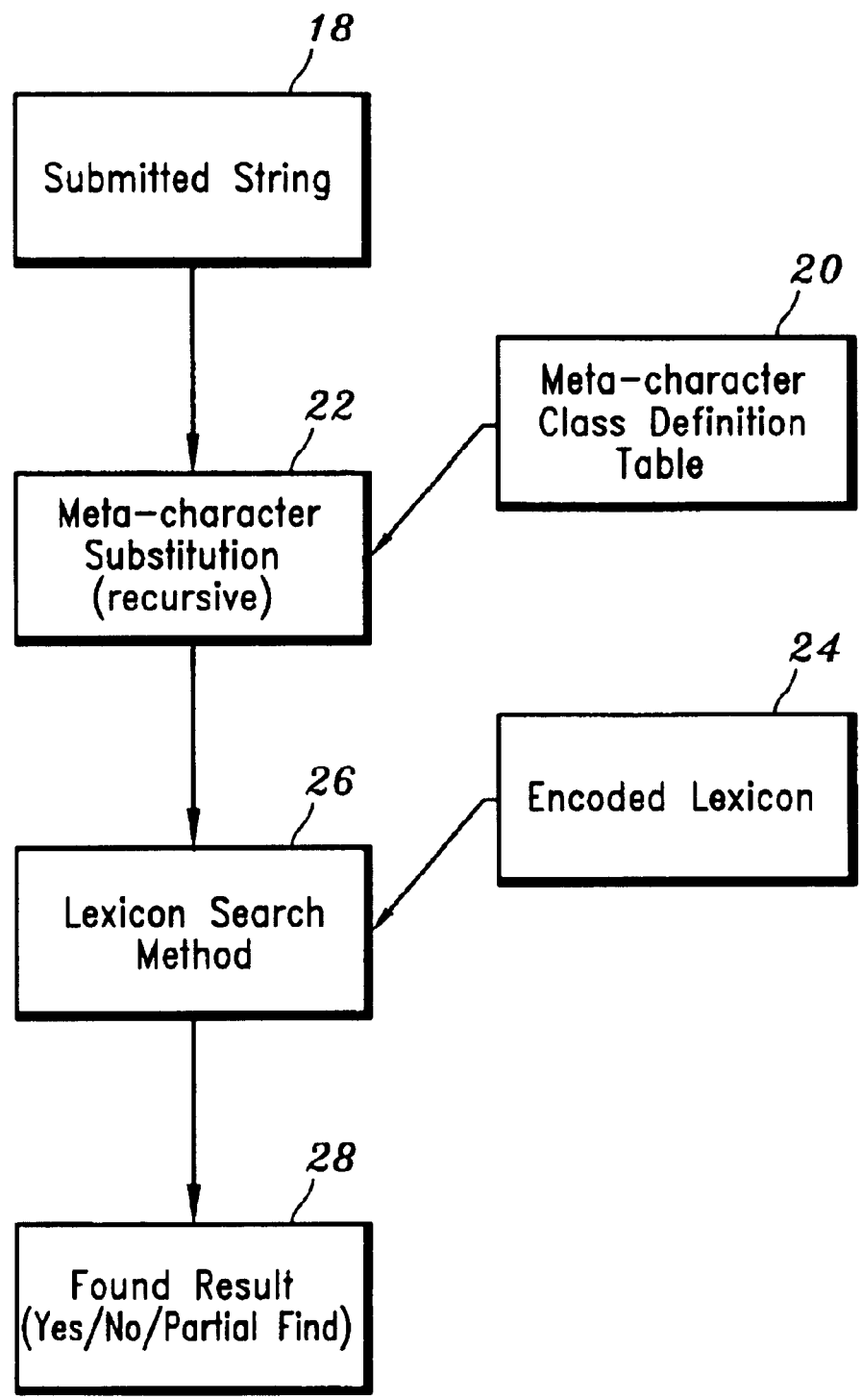
FIG. 3 is a flow diagram which shows a method for searching an encoded lexicon for the presence of a submitted string.

Referring now to FIG. 3, a method and example for searching an encoded lexicon 24 to determine whether a submitted string 18 is valid is illustrated. The submitted string is generally received from a language input system, such as a spelling verification program, a handwriting recognition program, a speech recognition system and the like. The process begins by recursively substituting characters 22 from the meta-character class definition table 20 into the submitted string 18 to generate a meta-string. Once substitution is complete, the encoded lexicon 24 is then searched 26 for matches to the meta-string. Searching can be done in any conventional manner known in the art for performing string comparisons. The search result 28 generally takes the form of YES (a complete match was found), NO (no match was found), and PARTIAL (a substantially similar entry was found, where the criteria for substantial similarity may be a variable). When a PARTIAL match results, the closest matches can be displayed for a user to enter a manual selection.

Applying the encoded lexicon and meta-character class definition table of FIGS. 1 and 2, assume that the string "hat" is submitted for recognition or verification. Upon meta-character substitution 22, the meta-string "hλ" is generated. This meta-string is then compared against the encoded lexicon 24, which in this case includes an entry "hλ". Therefore, the submitted string is valid and the search result 28 is YES. If the submitted string was "cat", this would result in a meta-string of "cλ" which would produce a result on either NO match or PARTIAL match, based upon the criteria established for a partial match. However, the submitted string "dog", will clearly generate a NO match result.

Figure 4:
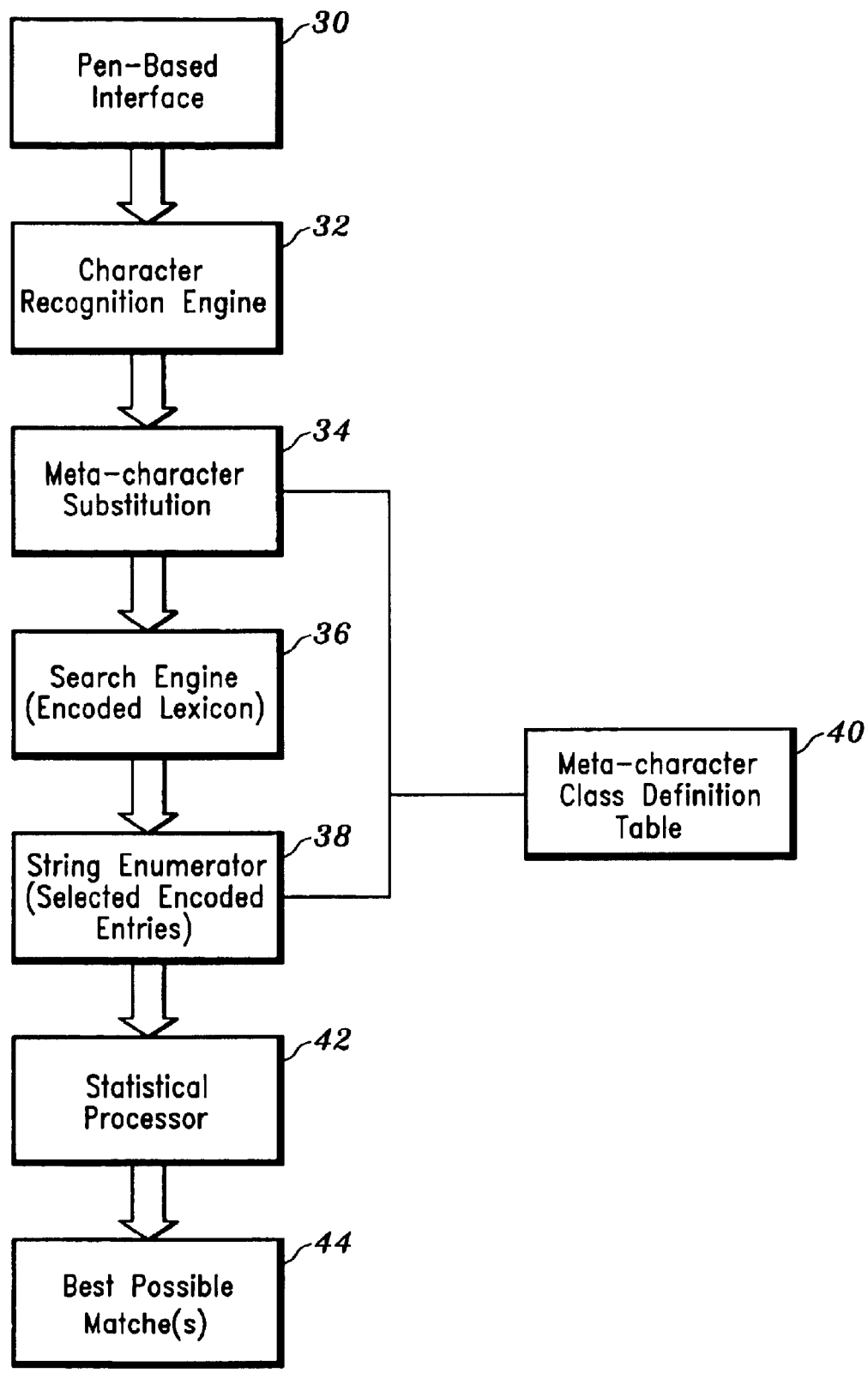
FIG. 4 is a block diagram illustrating a handwriting recognition system employing an encoded lexicon formed in accordance with the present invention.

FIG. 4 is a block diagram of a computer-based handwriting recognition system employing an encoded lexicon formed in accordance with the present invention. In this system, a language input device, such as a "pen-based" interface 30 is used to generate input data to the system. The pen-based interface 30 is operatively coupled to a processor running a character recognition engine 32. The character recognition engine 32 translates pen strokes into possible letters and symbols. For each string written by a user, the character recognition engine 32 provides one or more submitted strings into a meta-character substitution algorithm 34, as described in connection with FIG. 3. The meta-character substitution algorithm 34 uses a meta-character class definition table 40, which is generally stored in computer-based, non-volatile storage such as magnetic media and CD-ROM media. For each submitted string which includes one or more meta-characters, a meta-string is generated.

The meta-strings are submitted to a search engine 36 which compares each meta-string to entries in an encoded lexicon 36, which is formed in a manner described in connection with FIG. 1 and is preferably stored in computer-readable media, such as a computer hard disk drive or CD-ROM. The search engine 36 provides an output of encoded lexicon entries which match, or at least partially match the submitted string. This output is provided to a string enumerator 38 which is operatively coupled to the meta-character class definition table 40. The string enumerator 38 substitutes the letters and symbols represented by meta-characters and provides a list of lexicon entries which are possible matches to the string entered at the pen-based interface 30.

Preferably, the various combinations and permutations of sequential strings from the string enumerator are applied to a statistical processor 42. The statistical processor 42 evaluates possible text sequences, and based on common sentence structure, grammatical parsing, language expert routines and the like determines the best possible matches(s) for the entered language strings. The statistical processor provides the best possible matches(s) 44 to a user on a display unit or in a data file.

In a similar manner, the present invention can be applied to speech recognition systems. In these embodiments, the pen-based interface 30 is replaced with a suitable audio interface (not shown) and the character recognition engine 32 takes the form of a speech processor circuit. The audio interface and speech processor can be formed in any manner known in the field of speech recognition such that spoken language is converted into text based utterances suitable for meta-character substitution and further lexicon driven processing as previously described.

Figure 5:
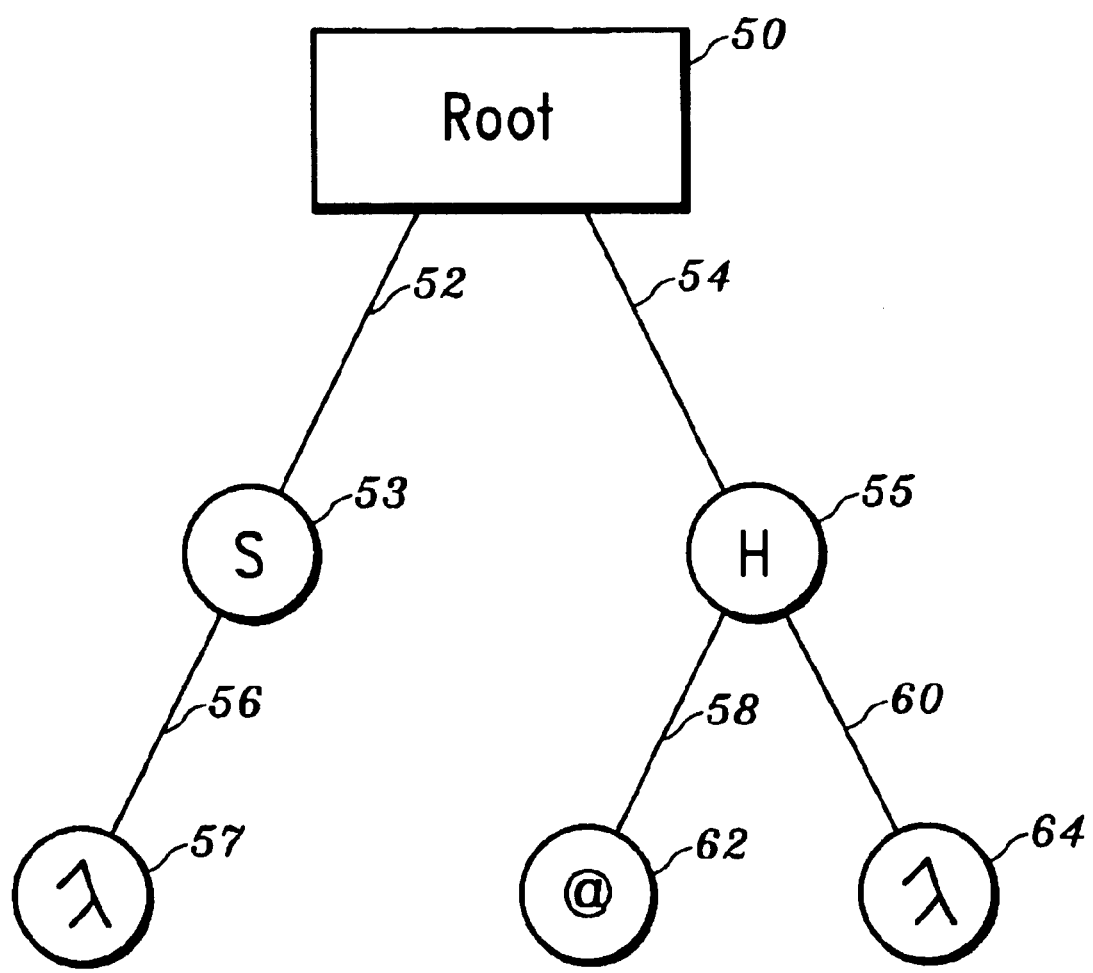
FIG. 5 is a pictorial diagram illustrating an encoded lexicon in the form of a tree-based data structure having a plurality of nodes representing characters in the lexicon entries and branches linking various nodes.

As an alternative to the search-based methods previously described, the present invention can also be practiced using a generative recognition method which does not require a subsequent search operation. In the generative method, the encoded lexicon is represented as a tree diagram as depicted in FIG. 5. Each branch of the tree begins with a first letter of an encoded lexicon entry. The tree structure is then extended through nodes representing subsequent characters of valid lexicon entries and branches linking the nodes in a sequential relationship. The encoded lexicon is used to generate one or more hypotheses representing possible matches to a string of applied data. At each successive level of the tree, the hypotheses are extended by adding characters represented by the subsequent nodes and the probabilities of these hypotheses representing the applied data are determined. If a hypothesis built by navigating a path through the encoded lexicon has a probability below a threshold value, indicating that a match is not likely, that path through the tree-based encoded lexicon is no longer pursued. Those hypotheses which are built by fully traversing a path in the encoded lexicon tree represent the best possible matches to the applied data and can be listed according to the various probabilities of matching the applied data.

Using the simplified example from FIG. 1, which includes an encoded lexicon representing the set of terms {hid, had, sit, sat, hit, hat} and meta-character definitions @={a,i} and λ={@+t}, the encoded lexicon tree will have a first branch 52 leading to node 53 representing the letter S and a second branch 54 leading to node 55 representing the letter H. Initial hypotheses generated by this encoded lexicon are {H, S }. The probability that the applied data string begins with one of these letters is then determined. For each hypothesis where the probability of a match exceeds a threshold, the generative process continues to a next level in the tree to refine the hypothesis. If the probability of a match is not above the threshold, the applied data is not likely represented in the encoded lexicon and the generative process terminates. Of course, in a comprehensive lexicon, an initial set of hypotheses will likely include all letters and many other language characters.

For example, assume that the probability that the applied data begins with the letter S is sufficiently high to continue along branch 56. The generative process advances to node 57 to generate refined hypotheses to test. As node 57 is the meta-character λ, the lexicon then generates two new hypotheses to test against the applied data, namely "SAT" and "SIT". For each of these two hypotheses, the probability of a match to the applied data is determined. If the probability of a match is sufficiently high, the hypothesis, which was generated by traversing successive branches of the encoded lexicon to a terminal node, is kept as a possible match to the applied data. Similarly, the process can advance along branch 54, through node 55, branches 58, 60 and into nodes 62, 64 to generate hypotheses beginning with the letter H which are represented in the encoded lexicon. Again, at each level in the encoded lexicon tree, the hypotheses which are generated are tested against the applied data in order to determine if the generated hypotheses are likely to match the applied data.

Because this process generates the various hypotheses by advancing along branches until the path through the encoded lexicon terminates or the probability of a match drops below an acceptable level, there is no need for a subsequent search of the encoded lexicon.

Having described preferred embodiments of the present invention, it is noted that modifications and variations can be made by persons skilled in the art in light of the above teachings. It is therefore to be understood that changes may be made in the particular embodiments of the invention disclosed which are within the scope and spirit of the invention as outlined by the appended claims.

What is claimed is:

1. A method for creating an encoded lexicon, comprising the steps of:
   defining a meta-character as representing a set of at least two symbols, and
   applying said meta-character to one or more entries of an unencoded lexicon of a word recognition system or a speech recognition system to provide an encoded lexicon comprising at least one entry that represents a plurality of entries in the unencoded lexicon, wherein the encoded lexicon is used during a recognition process for recognizing a character string.

2. A method for creating an encoded lexicon as defined by claim 1, wherein said applying step includes the steps of:
   reading an entry from an unencoded lexicon; and
   substituting each occurrence of said at least two symbols occurring in said unencoded lexicon entry with said meta-character in accordance with said meta-character definition to generate encoded lexicon entries.

3. A method for creating an encoded lexicon as defined by claim 2, further comprising the step of removing duplicate encoded lexicon entries from said encoded lexicon.

4. A method for creating an encoded lexicon as defined by claim 1, wherein said applying step includes the further step of defining lexicon entries not represented in the unencoded lexicon using said meta-character.

5. A method for creating an encoded lexicon as defined by claim 1, wherein said meta-character is an entry stored in an extensible meta-character definition table having a plurality of meta-characters.

6. A method for creating an encoded lexicon, as defined by claim 5, wherein said meta-character is at least partially defined by a second meta-character in said meta-character definition table.

7. A method for creating an entry in an encoded lexicon having a tree structure, comprising the steps of:
   a. defining a meta-character as representing a set of at least two symbols;
   b. defining a first character of an entry in an unencoded lexicon of a word recognition system or a speech recognition system;
   c. defining a subsequent character of the entry, at least one of said first character and subsequent character being said meta-character;
   d. linking said first character and said subsequent character by at least one branch; and
   e. creating an entry in an encoded lexicon by repeating steps c–d until the entry definition is complete, wherein the entry in the encoded lexicon represents a plurality of entries in the unencoded lexicon, wherein the encoded lexicon is used during a recognition process for recognizing a character string.

8. A method for creating an encoded lexicon as defined by claim 7, wherein said meta-character is a user defined entry stored in a meta-character definition table having a plurality of meta-characters.

9. A method for creating an encoded lexicon, as defined by claim 8, wherein said meta-character is at least partially defined by a second meta-character in said meta-character definition table.

10. A computer-based language verification system using a lexicon, comprising:
    a first data file having an unencoded lexicon of a language verification system;
    a second data file having a meta-character definition table, said meta-character definition table mapping a many to one relationship between a meta-character and a plurality of language characters;
    a computer processor, said computer processor being coupled to said first and second data files and generating a third data file therefrom, said third data file being an encoded lexicon with meta-characters from the second data file inserted into entries in said first data file in accordance with said meta-character definition table; and
    an input device coupled to said processor for submitting a language string for verification, said processor receiving said language string, performing meta-character substitution on said string in accordance with said meta-character definition table to generate a meta-string, searching said third data file for entries which at least partially match said meta-string, and unencoding said matching entries in accordance with said meta-character definition table to verify the language string.

11. A computer-based language verification system using a lexicon as defined by claim 10, wherein said input device includes a pen-based interface for receiving handwriting input.

12. A computer-based language verification system using a lexicon as defined by claim 10, wherein said input device includes a spelling verification program operating on a text document.

13. A computer-based language verification system using a lexicon as defined by claim 10, wherein said input device includes a speech recognition system having an audio input system and a speech processor to form the language string from spoken utterances.

14. A computer-based language verification system using a lexicon as defined by claim 10, wherein said second data file is a user extensible data structure.

15. A computer-based language verification system using a lexicon as defined by claim 10, wherein at least one of said meta-characters is at least partially defined by a second meta-character in said meta-character definition table.

16. A program storage device readable by machine, tangibly embodying a program of instructions executable by the machine to perform method steps for creating an encoded lexicon, the method steps comprising:
    defining a meta-character as representing a set of at least two symbols, and
    applying said meta-character to one or more entries of an unencoded lexicon of a word recognition system or a speech recognition system to provide an encoded lexicon comprising at least one entry that represents a plurality of entries in the unencoded lexicon, wherein the encoded lexicon is used during a recognition process for recognizing a character string.

17. A program storage device as defined by claim 16, wherein the instructions for performing the step of applying comprise instructions for performing the steps of:
    reading an entry from an unencoded lexicon; and
    substituting each occurrence of said at least two symbols occurring in said unencoded lexicon entry with said meta-character in accordance with said meta-character definition to generated encoded lexicon entries.

18. A program storage device as defined by claim 17, further comprising instructions for performing the step of removing duplicate encoded lexicon entries from said encoded lexicon.

19. A program storage device as defined by claim 16, wherein the instructions for performing the step of applying comprise instructions for performing the step of defining lexicon entries not represented in the unencoded lexicon using said meta-character.

20. A program storage device as defined by claim 16, wherein said meta-character is an entry stored in an extensible meta-character definition table having a plurality of meta-characters.

21. A program storage device as defined by claim 20, wherein said meta-character is at least partially defined by a second meta-character in said meta-character definition table.

22. A program storage device readable by machine, tangibly embodying a program of instructions executable by the machine to perform method steps for creating an entry in an encoded lexicon having a tree structure, the method steps comprising:

a. defining a meta-character as representing a set of at least two symbols;

b. defining a first character of an entry in an unencoded lexicon of a word recognition system or a speech recognition system;

c. defining a subsequent character of the entry, at least one of said first character and subsequent character being said meta-character;

d. linking said first character and said subsequent character by at least one branch; and e. creating an entry in an encoded lexicon by repeating steps c–d until the entry definition is complete, wherein the entry in the encoded lexicon represents a plurality of entries in the unencoded lexicon, wherein the encoded lexicon is used during a recognition process for recognizing a character string.

23. A program storage device as defined by claim 22, wherein said meta-character is a user defined entry stored in a meta-character definition table having a plurality of meta-characters.

24. A program storage device as defined by claim 22, wherein said meta-character is at least partially defined by a second meta-character in said meta-character definition table.

* * * * *

UNITED STATES PATENT AND TRADEMARK OFFICE
CERTIFICATE OF CORRECTION

PATENT NO. : 6,757,647 B1 Page 1 of 1
DATED : June 29, 2004
INVENTOR(S) : Nathan et al.

It is certified that error appears in the above-identified patent and that said Letters Patent is hereby corrected as shown below:

Title page,
Item [54], Title, should read as follows:
-- METHOD FOR ENCODING REGULAR EXPRESSIONS IN A LEXICON --

Signed and Sealed this

Twenty-sixth Day of October, 2004

JON W. DUDAS
*Director of the United States Patent and Trademark Office*